Dec. 26, 1933.    F. W. YUTZLER    1,941,239
GAUGE
Filed Feb. 18, 1932
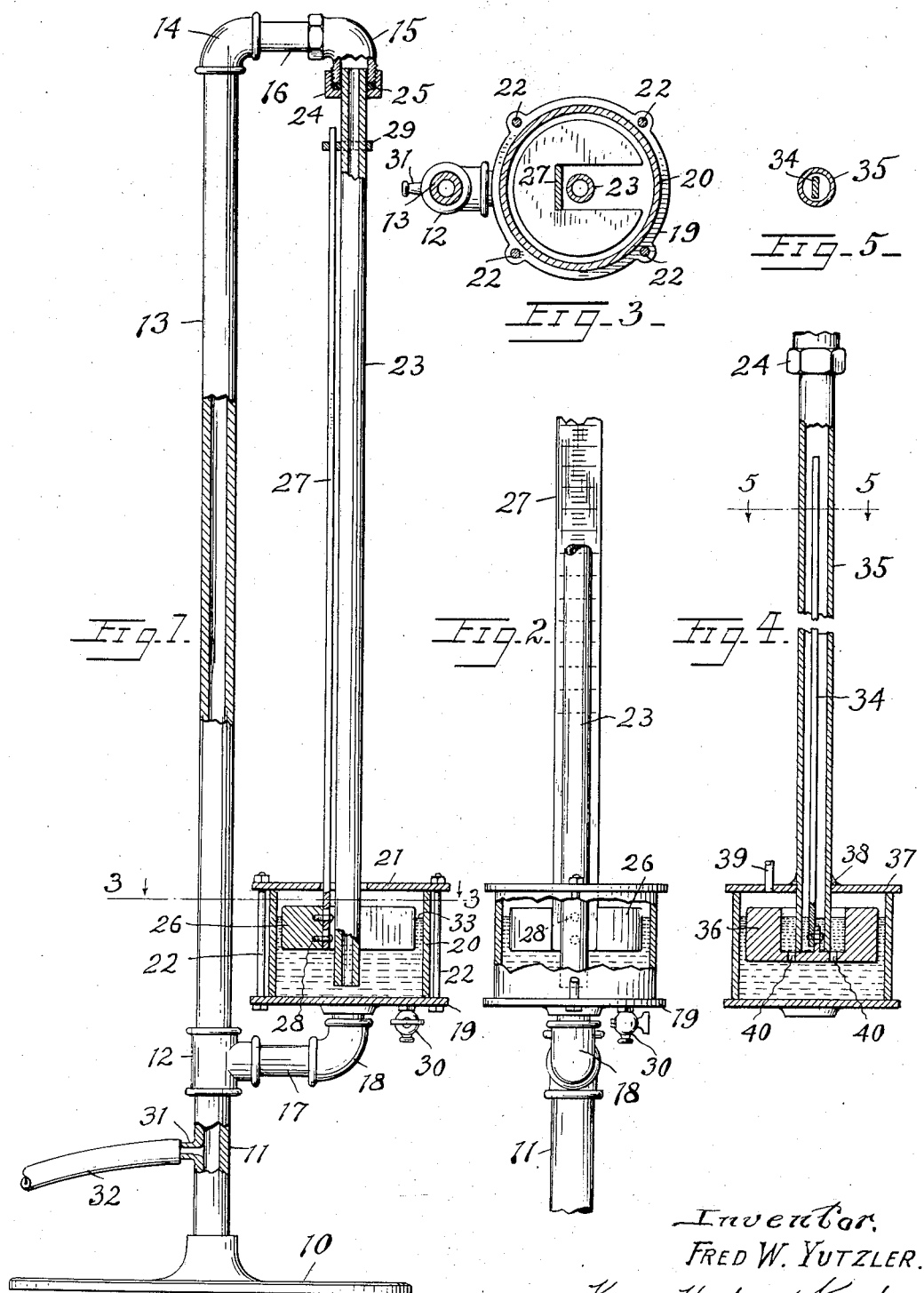
Inventor,
FRED W. YUTZLER.
Kwis Hudson & Kent
attys.

Patented Dec. 26, 1933

1,941,239

UNITED STATES PATENT OFFICE 1,941,239

GAUGE

Fred W. Yutzler, Rome, N. Y., assignor to The Kent Company, Inc., Rome, N. Y., a corporation of New York Application February 18, 1932. Serial No. 593,787

4 Claims. (Cl. 73—31)

This invention relates to gauges and, more particularly, to vacuum gauges, although the principles of construction are applicable to pressure gauges.

The class of gauges to which the invention relates is that employing a column of liquid, the height of which is measured for the purpose of ascertaining the vacuum or pressure. Ordinarily, such gauges consist of a U-tube with a body of mercury or other liquid therein and the pressure or vacuum is applied to the top of one branch of the tube and readings of the levels of the liquid in the two branches of the tube are measured and, from these readings, the difference in height of the two columns of liquid is determined.

It is one of the objects of the present invention to provide a gauge of the type employing a column of liquid, that will permit the vacuum or pressure to be read directly and without the necessity for calculating the difference in the height of two columns of liquid.

It is a further object of the invention to provide an instrument of the type described, that will be comparatively simple in construction, readily portable, and that will be accurate.

Other objects of the invention and the features of novelty will be apparent from the following description taken in connection with the accompanying drawing, of which Figure 1 is a side elevation of an instrument embodying my invention, certain parts being shown in section;

Fig. 2 is a fragmentary front elevation of the instrument shown in Fig. 1, with certain parts broken away;

Fig. 3 is a transverse section on the line 3—3 of Fig. 1;

Fig. 4 is a fragmentary elevation of another form of construction embodying my invention; and Fig. 5 is a transverse section on the line 5—5 of Fig. 4.

Referring to Figs. 1, 2 and 3, the instrument therein illustrated comprises a base 10 in which a tubular standard is secured, this standard consisting of the short piece of pipe 11, the T fitting 12, and the pipe 13. At the upper end of the pipe 13 there is a lateral extension formed by the elbows 14 and 15 and the nipple 16. The T 12 carries a laterally projecting arm which is formed by the nipple 17 and the elbow 18. A liquid receptacle is supported by this laterally projecting arm and consists of a bottom plate 19, a cylinder 20, preferably of glass, and a top plate 21, the cylinder 20 being clamped between the plates 19 and 21 by the bolts 22. It will be understood that the joint between the bottom of the cylinder 20 and the plate 19 will be liquid-tight to prevent leakage of the liquid from the receptacle.

A glass tube 23 has its upper end secured in the lower end of the elbow 15 by means of a gland nut 24 and suitable packing 25 so as to form a tight connection between the elbow and the tube. The tube 23 projects through the cover 21 of the liquid receptacle to a point adjacent the bottom thereof and a horseshoe-shaped float 26 is arranged within the receptacle so as to float on the liquid therein. A scale 27 is adjustably secured, at its lower end, to the float 26, by means of screws 28 and the upper end of this scale is secured to a ring 29 that is freely slidable on the glass tube or column 23. A drain plug 30 is arranged in the bottom plate 19 of the liquid receptacle for the purpose of draining the liquid therefrom whenever desired. The pipe 11 has a hollow lateral extension 31 to which a flexible tube 32 is attached, this tube being for the purpose of connecting the instrument with the space in which the vacuum is to be measured. By this arrangement, the tube 32 is connected with the instrument near the base so as to be out of the way and also have little or no tendency to overbalance and upset the instrument.

It will be understood that all of the joints of the standard which is made up of the pipes 11 and 13 and the T 12, will be tight so that the vacuum in the tube 32 will be applied to the upper end of the tubular column 23. The liquid receptacle is filled with liquid to the level indicated by the line 33 and the scale 27 is adjusted on the float 26 so that the zero point on the scale coincides with the liquid level 33. The calibrations on the scale 27 will, therefore, indicate heights above the liquid level 33 in the receptacle. When vacuum is applied to the instrument by means of the tube 32, the liquid will rise in the column 23 to a point corresponding to the amount of the vacuum and, as the liquid rises in the column 23, the level 33, in the receptacle, will be lower but, since the zero point on the scale 27 coincides with the level 33 at all times, the amount of the vacuum may be read directly from the scale 27 by noting the point on the scale which coincides with the level of the liquid in the column 23. The liquid in the receptacle may be mercury, water, or any other liquid, and the scale 27 may be calibrated according to the metric or any other desired system of measurement.

In the form of the invention illustrated in Figs. 4 and 5, the scale 34 is arranged within the glass column 35 and adjustably secured to the float 36. The column 35 may be sealed to the cover plate 37 of the receptacle, by a suitable cement indicated at 38, and the cover plate may be provided with a tube 39 which may serve as a vent tube, for the interior of the receptacle, when the instrument is used as a vacuum gauge, or the tube 39 may serve as a means for connecting a flexible tube, similar to the tube 32, to apply pressure to the interior of the receptacle when the instrument is used as a pressure gauge. In the latter case, the extension 31 on the standard would act as a vent tube. Openings 40 may be provided in the bottom of the float 36 to permit the liquid to enter the central well therein.

It will be apparent that when pressure is applied to the interior of the receptacle, by means of the tube 39, the liquid in the receptacle will be forced upwardly in the column 35 and the height to which the liquid rises in the column will be measured on the scale 34 and thus the pressure may be determined. On the other hand, when the instrument is used as a vacuum gauge the tube 39 will act as a vent for the interior of the liquid receptacle, and the operation of the instrument will be similar to that described in connection with the form illustrated in Figs. 1 to 3.

While I have described and illustrated what I now consider to be the preferred form of my invention, it will be understood that the various details of construction may be varied without departing from the spirit of the invention as defined in the appended claims.

Having thus described my invention, I claim:

1. In a device of the class described, the combination of a receptacle having a body of liquid therein, a transparent tubular column having its lower end arranged in said body of liquid, a float on said liquid, and a gauge carried by said float and extending upwardly therefrom exteriorly of and alongside said column and slidable relative to the latter, said gauge having calibrations to indicate heights above the level of the liquid in said receptacle.

2. In apparatus of the class described, the combination of a tubular standard having a downwardly opening extension at its upper end and a connection adjacent its lower end through which the vacuum to be measured is transmitted, a laterally extending arm on said standard, a transparent tubular column connected with said extension, a receptacle for a liquid carried by said arm and into which the lower end of said column projects, a float on the liquid in said receptacle, and a gauge carried by said float and movable relative to said column.

3. In apparatus of the class described, the combination of a tubular standard having a downwardly opening extension at its upper end, a transparent tubular column connected with said extension, a receptacle carried by said standard and containing a body of liquid into which the lower end of said column projects, a float on the liquid in said receptacle, a gauge carried by said float and movable relative to said column, and separate venting means for said receptacle and said standard, one of said venting means being adapted to serve as the connection through which the apparatus is subjected to the fluid tension to be measured.

4. In apparatus of the class described, the combination of a tubular standard having a downward extension at its upper end, a receptacle for a body of liquid, a transparent tubular column connected with said extension and having its lower end submerged in the liquid in said receptacle, a float on said liquid, a gauge secured to said float so as to be vertically adjustable relative thereto, said gauge being movably associated with said column so as to measure the elevation of the liquid therein, separate venting means for said receptacle and for the upper end of said column, one of said venting means being adapted to serve as the connection through which the apparatus is subjected to the fluid tension to be measured.

FRED W. YUTZLER.